US012776007B2

(12) United States Patent
Li et al.

(10) Patent No.: US 12,776,007 B2
(45) Date of Patent: Oct. 27, 2026

(54) SYSTEMS AND METHODS FOR ARTIFACT REMOVING

(71) Applicant: SHANGHAI UNITED IMAGING HEALTHCARE CO., LTD., Shanghai (CN)

(72) Inventors: Biao Li, Shanghai (CN); Yanyan Liu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 273 days.

(21) Appl. No.: 18/614,626

(22) Filed: Mar. 22, 2024

(65) Prior Publication Data

US 2025/0037243 A1 Jan. 30, 2025

Related U.S. Application Data

(63) Continuation of application No. PCT/CN2022/120969, filed on Sep. 23, 2022.

(30) Foreign Application Priority Data

Sep. 23, 2021 (CN) ......................... 202111117116.X

(51) Int. Cl.
*G06F 18/214* (2023.01)
*G06T 5/50* (2006.01)
(Continued)

(52) U.S. Cl.
CPC .................. *G06T 5/60* (2024.01); *G06T 5/50* (2013.01); *G06T 12/30* (2026.01);
(Continued)

(58) Field of Classification Search
None
See application file for complete search history.

(56) References Cited

U.S. PATENT DOCUMENTS 10,083,499 B1 9/2018 Milanfar et al.
11,062,489 B2 * 7/2021 Chen et al. ............. G06T 12/20
(Continued)

FOREIGN PATENT DOCUMENTS

CN 107730455 A 2/2018
CN 105701778 B 4/2018
(Continued)

OTHER PUBLICATIONS

International Search Report in PCT/CN2022/120969 mailed on Dec. 28, 2022, 4 pages.
(Continued)

*Primary Examiner* — Twyler L Haskins
(74) *Attorney, Agent, or Firm* — METIS IP LLC

(57) ABSTRACT

A method and a system for training an initial artifact removal model may be provided. One or more first initial images, one or more objective feature maps corresponding to the one or more first initial images, and one or more reference images corresponding to the one or more first initial images may be obtained. A trained artifact removal model may be generated by training the initial artifact removal model using the one or more first initial images, the one or more objective feature maps, and the one or more reference images.

20 Claims, 5 Drawing Sheets

100

(51) Int. Cl.
*G06T 5/60* (2024.01)
*G06T 12/30* (2026.01)

(52) U.S. Cl.
CPC ................................ *G06T 2200/24* (2013.01); *G06T 2207/10081* (2013.01); *G06T 2207/10088* (2013.01); *G06T 2207/10104* (2013.01); *G06T 2207/10132* (2013.01); *G06T 2207/20081* (2013.01); *G06T 2207/30004* (2013.01); *G06T 2207/30164* (2013.01); *G06T 2210/41* (2013.01); *G06T 2211/441* (2023.08); *G06T 2211/448* (2023.08)

(56) References Cited

U.S. PATENT DOCUMENTS

| | | | | |
|---|---|---|---|---|
| 11,869,171 | B2 * | 1/2024 | Yao et al. | G06T 5/60 |
| 2006/0010095 | A1 | 1/2006 | Wolff et al. | |
| 2020/0334871 | A1 | 10/2020 | Su et al. | |
| 2021/0012543 | A1 | 1/2021 | Hein et al. | |

FOREIGN PATENT DOCUMENTS

| | | | |
|---|---|---|---|
| CN | 109214992 | A | 1/2019 |
| CN | 109272472 | A | 1/2019 |
| CN | 106960429 | B | 8/2019 |
| CN | 110310346 | A | 10/2019 |
| CN | 110796613 | A | 2/2020 |
| CN | 106909947 8 | | 6/2020 |
| CN | 111223066 | A | 6/2020 |
| CN | 111223156 | A | 6/2020 |
| CN | 111223161 | A | 6/2020 |
| CN | 111402150 | A | 7/2020 |
| CN | 111815521 | A | 10/2020 |
| CN | 111861910 | A | 10/2020 |
| CN | 111968195 | A | 11/2020 |
| CN | 112037146 | A | 12/2020 |
| CN | 112085809 | A | 12/2020 |
| CN | 112150574 | A | 12/2020 |
| CN | 112017131 | B | 2/2021 |
| CN | 112508808 | A | 3/2021 |
| CN | 114241070 | A | 3/2022 |
| WO | 2023046092 | A1 | 3/2023 |

OTHER PUBLICATIONS

Written Opinion in PCT/CN2022/120969 mailed on Dec. 28, 2022, 5 pages.

First Office Action in Chinese Application No. 202111117116.X mailed on Jun. 29, 2023, 17 pages.

* cited by examiner

200

SYSTEMS AND METHODS FOR ARTIFACT REMOVING

CROSS-REFERENCE TO RELATED APPLICATIONS

This application is a continuation of International Application No. PCT/CN2022/120969, filed on Sep. 23, 2022, which claims priority to Chinese Patent Application No. 202111117116.X, filed on Sep. 23, 2021, the contents of which are hereby incorporated by reference.

TECHNICAL FIELD

The present disclosure relates to the field of image processing, and in particular, to systems and methods for removing artifacts in an image.

BACKGROUND

During medical imaging (e.g., CT imaging), compared with human tissue, a metal has a stronger absorption of photons and a higher attenuation coefficient of X-rays. When an X-ray beam passes through the metal, the X-ray beam may harden, and accordingly, noises, volume effects, and scattering effects may be exacerbated, which may cause metallic artifacts in a reconstructed image. Artifacts in the reconstructed image may be removed using a machine learning model. Conventionally, information relating to the artifacts (e.g., sizes, natures, etc., of the metal(s)) is not used by the machine learning model to remove artifacts in the reconstructed image, thereby limiting the accuracy and effect of the machine learning model in artifact removing. Thus, it may be desirable to provide systems and methods for removing artifacts in image(s) effectively.

SUMMARY

According to an aspect of the present disclosure, a method for training an initial artifact removal model may be provided. The method may include obtaining one or more first initial images and one or more objective feature maps corresponding to the one or more first initial images. The method may also include obtaining one or more reference images corresponding to the one or more first initial images. The method may further include generating a trained artifact removal model by training the initial artifact removal model using the one or more first initial images, the one or more objective feature maps, and the one or more reference images. Specifically, the method may include inputting the one or more first initial images and the one or more objective feature maps into the initial artifact removal model. The method may also include using the one or more first initial images as first training samples, and using the one or more reference images as first labels corresponding to the first training samples, and adjusting one or more parameters of the initial artifact removal model based on the one or more objective feature maps and the first labels.

In some embodiments, the method may include obtaining one or more preliminary correction images corresponding to the one or more first initial images. The method may further include generating the trained artifact removal model by training the initial artifact removal model using the one or more first initial images, the one or more preliminary correction images, the one or more objective feature maps, and the one or more reference images.

In some embodiments, the method may include, for each first initial image of the one or more first initial images, obtaining objective information corresponding to the first initial image. The method may also include transforming the objective information into one or more word vectors based on a feature mapping dictionary. The method may further include generating an objective feature map corresponding to the first initial image by combining the one or more word vectors.

In some embodiments, each objective feature map of the one or more objective feature maps may be obtained using a trained objective feature map determination model. The trained objective feature map determination model may include an objective information acquisition unit and an objective feature map generation unit. The each objective feature map may be obtained by the following operations. A first initial image of the one or more first initial images corresponding to the each objective feature map may be inputted into the objective information acquisition unit to obtain at least a portion of objective information corresponding to the first initial image. The objective information may be transformed into one or more word vectors based on a feature mapping dictionary. Each objective feature map may be generated by inputting the one or more word vectors corresponding to the objective information into the objective feature map generation unit.

In some embodiments, the method may include obtaining an initial objective feature map determination model. The method also include training the initial objective feature map determination model and the initial artifact removal model synchronously. One or more word vectors corresponding to objective information of each first initial image of the one or more first initial images may be input into the initial objective feature map determination model. The initial objective feature map determination model may output an objective feature map corresponding to the each first initial image.

In some embodiments, the training the initial objective feature map determination model and the initial artifact removal model synchronously may include the following operations. The objective feature map output by the initial objective feature map determination model may be inputted into the initial artifact removal model, and parameters of the initial artifact removal model may be adjusted bases on an output of the initial artifact removal model, while remaining parameters of the initial objective feature map determination model unchanged. A score of the output of the initial artifact removal model may be determined. The score may be designated as a second label to train the initial objective feature map determination model and the initial artifact removal model synchronously, and parameters of the initial objective feature map determination model may be adjusted based on the second label, while remaining the parameters of the initial artifact removal model unchanged. In the synchronous training of the initial objective feature map determination model and the initial artifact removal model, the second label may be updated based on the score of the output of the initial artifact removal model.

In some embodiments, the trained artifact removal model may include two or more artifact removal sub-models. The trained objective feature map determination model may include a classification model. A classification result output by the classification model may be configured to indicate a target artifact removal sub-model among the two or more artifact removal sub-models used for artifact removal.

According to another aspect of the present disclosure, a method for training an initial objective feature map determination model. The method may include obtaining one or more second initial images, and objective information corresponding to each second initial image of the one or more second initial images. The method may also include inputting the objective information into the initial objective feature map determination model. The method may further include using the objective information corresponding to the each second initial image as a second training sample, and using a score corresponding to the each second initial image as a second label, and adjusting one or more parameters of the initial objective feature map determination model based on the second label to obtain a trained objective feature map determination model.

In some embodiments, the objective information corresponding to each second initial image may include at least one of a type, a size, an intensity, a location of one or more artifact in the each second initial image, or an artifact rate, scan parameters, a scan scene, window width and window level information of the each second initial image.

In some embodiments, the second label may be obtained by the following operations. The each second initial image may be inputted into a pre-trained artifact removal model to obtain an output image. A score of the output image may be determined. The second label may be determined based on the score.

In some embodiments, the pre-trained artifact removal model may be obtained by the following operations. One or more third initial images may be obtained. An initial artifact removal model may be pre-trained by using the one or more third initial images as third training samples, and using one or more reference standard images corresponding to the one or more third initial images as third labels, to obtain the pre-trained artifact removal model, wherein each of the one or more reference standard images has a reference score.

According to yet another aspect of the present disclosure, a method for artifact removing. The method may include obtaining an initial image and an objective feature map corresponding to the initial image. The method may also include obtaining a target image with no or reduced artifact by inputting the initial image and the objective feature map into a trained artifact removal model.

In some embodiments, the method may include obtaining a preliminary correction image corresponding to the initial image. The method may further include obtaining the target image with no or reduced artifact by inputting the initial image, the preliminary correction image, and the objective feature map into the trained artifact removal model.

In some embodiments, the objective feature map may be used as a hyper-parameter of the trained artifact removal model, and configured to facilitate the trained artifact removal model to remove one or more artifacts corresponding to objective information represented by the objective feature map.

In some embodiments, the objective feature map may include objective information relating to one or more artifacts in the initial image.

In some embodiments, the objective feature map may be obtained by the following operations. Objective information corresponding to the initial image may be obtained. The objective information may be transformed into one or more word vectors based on a feature mapping dictionary. The objective feature map corresponding to the initial image may be generated by combining the one or more word vectors.

In some embodiments, the objective feature map may be obtained using a trained objective feature map determination model. The trained objective feature map determination model may include an objective information acquisition unit and an objective feature map generation unit. The objective feature map may be obtained by the following operations. The initial image corresponding to the objective feature map may be inputted into the objective information acquisition unit to obtain objective information corresponding to the initial image. The objective information may be transformed into one or more word vectors based on a feature mapping dictionary. The objective feature map may be generated by inputting the one or more word vectors corresponding to the objective information into the objective feature map generation unit.

In some embodiments, the objective feature map may include information of window width and window level. The method may include adjusting, window widths and window levels of the initial image, the preliminary correction image, and the target image using the trained artifact removal model based on the information of window width and window level included in the objective feature map.

In some embodiments, the trained artifact removal model may include two or more artifact removal sub-models. The method may include determining a target sub-model among the two or more artifact removal sub-models based on the objective feature map. The method may also include obtaining the target image with no or reduced artifact by inputting the initial image, the preliminary correction image, and the objective feature map into the target sub-model.

In some embodiments, the objective feature map may include information relating to a degree of artifact removal.

In some embodiments, the method may include determining a score of the target image. The method may include determining whether to further process the target image based on the score. In response to a determination that the target image is to be further processed, the method may further include updating the objective feature map based on the score to obtain an updated objective feature map, and obtaining an updated target image by inputting the target image, the preliminary correction image, and the updated objective feature map into the trained artifact removal model.

In some embodiments, the method may include determining a similarity between the target image and the initial image. The method may further include determining the score of the target image based on the similarity.

In some embodiments, the method may include obtaining an instruction through a user interface. The instruction may indicate a score of the target image or information relating to adjustment of a degree of artifact removal. The method may also include updating the objective feature map based on the instruction to obtain an updated objective feature map. The method may further include obtaining an updated target image by inputting the target image, the preliminary correction image, and the updated objective feature map into the trained artifact removal model.

According to yet another aspect of the present disclosure, a system for training an initial artifact removal model may be provided. The system may include at least one storage device including a set of instructions and at least one processor. The at least one processor may be configured to communicate with the at least one storage device. When executing the set of instructions, the at least one processor may be configured to direct the system to perform the following operations. The system may obtain one or more first initial images and one or more objective feature maps corresponding to the one or more first initial images. The system may also obtain one or more reference images corresponding to the one or more first initial images. The system may further generate a trained artifact removal model by training the initial artifact removal model using the one or more first initial images, the one or more objective feature maps, and the one or more reference images. The system may input the one or more first initial images and the one or more objective feature maps into the initial artifact removal model. The system may use the one or more first initial images as first training samples, and use the one or more reference images as first labels corresponding to the first training samples, and adjust one or more parameters of the initial artifact removal model based on the one or more objective feature maps and the first labels.

According to yet another aspect of the present disclosure, a system for training an initial objective feature map determination model may be provided. The system may include at least one storage device including a set of instructions and at least one processor. The at least one processor may be configured to communicate with the at least one storage device. When executing the set of instructions, the at least one processor may be configured to direct the system to perform the following operations. The system may obtain one or more second initial images, and objective information corresponding to each second initial image of the one or more second initial images. The system may input the objective information into the initial objective feature map determination model. The system may further use the objective information corresponding to the each second initial image as a second training sample, and use a score corresponding to the each second initial image as a second label, and adjust one or more parameters of the initial objective feature map determination model based on the second label to obtain a trained objective feature map determination model.

According to yet another aspect of the present disclosure, a system for artifact removing may be provided. The system may include at least one storage device including a set of instructions and at least one processor. The at least one processor may be configured to communicate with the at least one storage device. When executing the set of instructions, the at least one processor may be configured to direct the system to perform the following operations. The system may obtain an initial image and an objective feature map corresponding to the initial image. The system may further obtain a target image with no or reduced artifact by inputting the initial image and the objective feature map into a trained artifact removal model.

According to yet another aspect of the present disclosure, a system for training an initial artifact removal model may be provided. The system may include an acquisition module and a model generation module. The acquisition module may be configured to obtain one or more first initial images one or more objective feature maps corresponding to the one or more first initial images, and one or more reference images corresponding to the one or more first initial images. The model generation module may be configured to generate a trained artifact removal model by training the initial artifact removal model using the one or more first initial images the one or more objective feature maps, and the one or more reference images. The model generation module may input the one or more first initial images and the one or more objective feature maps into the initial artifact removal model. The model generation module may use the one or more first initial images as first training samples, and use the one or more reference images as first labels corresponding to the first training samples, and adjust one or more parameters of the initial artifact removal model based on the one or more objective feature maps and the first labels.

According to yet another aspect of the present disclosure, a system for training an initial objective feature map determination model may be provided. The system may include an acquisition module and a model generation module. The acquisition module may be configured to obtain one or more second initial images, and objective information corresponding to each second initial image of the one or more second initial images. The model generation module may be configured to input the objective information into the initial objective feature map determination model. The model generation module may also be configured to use the objective information corresponding to the each second initial image as a second training sample, use a score corresponding to the each second initial image as a second label, and adjust one or more parameters of the initial objective feature map determination model based on the second label to obtain a trained objective feature map determination model.

According to yet another aspect of the present disclosure, a system for artifact removing may be provided. The system may include an acquisition module and a generation module. The acquisition module be configured to obtain an initial image and an objective feature map corresponding to the initial image. The generation module may be configured to obtain a target image with no or reduced artifact by inputting the initial image and the objective feature map into a trained artifact removal model.

According to yet another aspect of the present disclosure, a non-transitory computer readable medium may be provided. The non-transitory computer readable medium may include at least one set of instructions for training an initial artifact removal model. When executed by one or more processors of a computing device, the at least one set of instructions may cause the computing device to perform a method. The method may include obtaining one or more first initial images and one or more objective feature maps corresponding to the one or more first initial images. The method may also include obtaining one or more reference images corresponding to the one or more first initial images. The method may further include generating a trained artifact removal model by training the initial artifact removal model using the one or more first initial images, the one or more objective feature maps, and the one or more reference images. Specifically, the method may include inputting the one or more first initial images and the one or more objective feature maps into the initial artifact removal model. The method may also include using the one or more first initial images as first training samples, and using the one or more reference images as first labels corresponding to the first training samples, and adjusting one or more parameters of the initial artifact removal model based on the one or more objective feature maps and the first labels.

According to yet another aspect of the present disclosure, a non-transitory computer readable medium may be provided. The non-transitory computer readable medium may include at least one set of instructions for training an initial objective feature map determination model. When executed by one or more processors of a computing device, the at least one set of instructions may cause the computing device to perform a method. The method may include obtaining one or more second initial images, and objective information corresponding to each second initial image of the one or more second initial images. The method may also include inputting the objective information into the initial objective feature map determination model. The method may further include using the objective information corresponding to the each second initial image as a second training sample, and using a score corresponding to the each second initial image as a second label, and adjusting one or more parameters of the initial objective feature map determination model based on the second label to obtain a trained objective feature map determination model.

According to yet another aspect of the present disclosure, a non-transitory computer readable medium may be provided. The non-transitory computer readable medium may include at least one set of instructions for artifact removing. When executed by one or more processors of a computing device, the at least one set of instructions may cause the computing device to perform a method. The method may include obtaining an initial image and an objective feature map corresponding to the initial image. The method may also include obtaining a target image with no or reduced artifact by inputting the initial image and the objective feature map into a trained artifact removal model.

According to yet another aspect of the present disclosure, a device may be provided. The device may include at least one processor and at least one storage device for storing a set of instructions. When the set of instructions are executed by the at least one processor, the device may perform the method for training an initial artifact removal model.

According to yet another aspect of the present disclosure, a device may be provided. The device may include at least one processor and at least one storage device for storing a set of instructions. When the set of instructions are executed by the at least one processor, the device may perform the method for training an initial objective feature map determination model.

According to yet another aspect of the present disclosure, a device may be provided. The device may include at least one processor and at least one storage device for storing a set of instructions. When the set of instructions are executed by the at least one processor, the device may perform the method for artifact removing.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
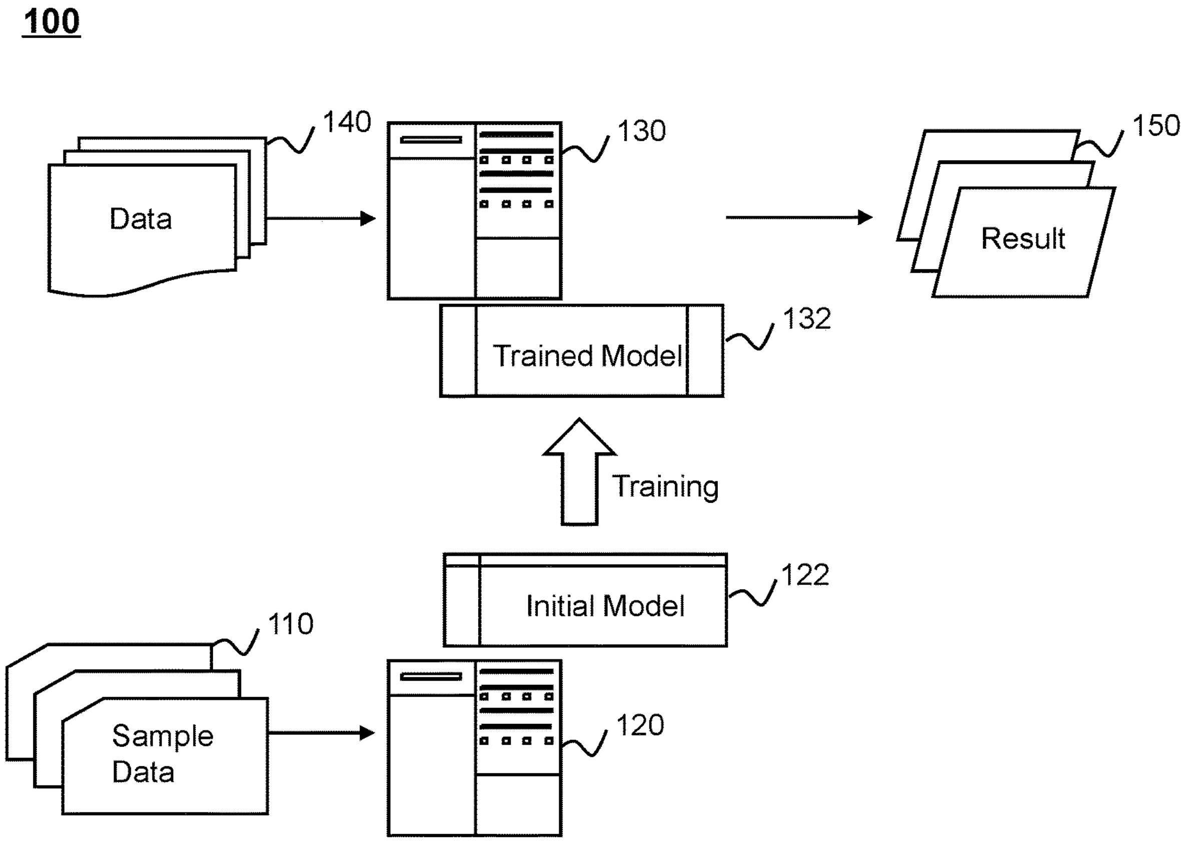
FIG. 1 is a schematic diagram illustrating an exemplary artifact removal system 100 according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in the present disclosure, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

FIG. 1 is a schematic diagram illustrating an exemplary artifact removal system 100 according to some embodiments of the present disclosure.

In some embodiments, the artifact removal system 100 may obtain a trained artifact removal model by implementing the methods and/or processes disclosed in the present disclosure. In some embodiments, the artifact removal system 100 may use the trained artifact removal model to perform an artifact removing process on an image (e.g., a medical image) to obtain a target image with no or reduced artifact. An artifact in an image (e.g., a CT reconstructed image) of a subject refers to a spurious image or an interference that exists in the image but is not any portion of the subject. In some embodiments, the artifact removal system 100 may remove one or more types of artifacts, such as a metallic artifact, a motion artifact, a streak artifact, a shadow artifact, a ring artifact, or a band artifact, etc. In some embodiments of the present disclosure, the artifact may include the metallic artifact.

As shown in FIG. 1, the artifact removal system 100 may include a first computing system 120 and a second computing system 130. The first computing system 120 and the second computing system 130 may be a same computing system, or different computing systems. The first computing system 120 and the second computing system 130 refer to systems with computing capabilities, which may include various computers, such as servers, personal computers, or computing platforms composed of multiple computers connected in various manners. In some embodiments, the first computing system 120 and the second computing system 130 may be deployed on different computing devices. In some embodiments, the first computing system 120 and the second computing system 130 may be deployed on a same computing device, so that the computing device has the functions of model training and image processing performed by a trained model at the same time.

The first computing system 120 and/or the second computing system 130 may include processor(s) configured to execute program instructions. Exemplary processor(s) may include a central processing unit (CPU), a graphics processing unit (GPU), a microprocessor, an application-specific integrated circuit (ASIC), or the like, or any combination thereof.

The first computing system 120 and/or the second computing system 130 may include display device(s). The display device(s) may be configured to receive and display an image (e.g., an initial image, a preliminary correction image, an objective feature map, a reference image, a target image, etc.) from the processor(s). A reference image may be obtained by removing artifact(s) (e.g., metallic artifacts) in an image using one or more other algorithms (e.g., an iterative algorithm, an interpolation algorithm), and can be used as a ground truth (also referred to as a label) for model training. The target image may refer to an image with no or reduced artifact(s) that is obtained after artifact removing using a trained artifact removal model. The display device(s) may include various types of screens for display and/or devices with information receiving and/or sending functions, such as computers, mobile phones, tablet computers, or the like.

The first computing system 120 and/or the second computing system 130 may include storage device(s) for storing instructions and/or data. Exemplary storage device(s) may include a mass memory, a removable memory, a volatile read-write memory, a read-only memory (ROM), or the like, or any combination thereof.

The first computing system 120 and/or the second computing system 130 may also include networks for internal connections and/or external connections. The networks may include a wired network or a wireless network.

In some embodiments, the first computing system 120 may obtain sample data 110 for training a model. For example, the sample data 110 may include data for training an initial artifact removal model. For example, the sample data 110 may include one or more raw images with metallic artifacts. The sample data 110 may be input into the first computing system 120 in a variety of common manners.

In some embodiments, the first computing system 120 may be configured to train an initial model 122 (e.g., an initial artifact removal model), and update parameters of the initial model 122 to obtain a trained model.

In some embodiments, the second computing system 130 may acquire data 140 (e.g., an image to be processed). The data 140 may be input into the second computing system 130 in a variety of common manners.

In some embodiments, the second computing system 130 may be configured to perform an image processing operation (e.g., an artifact removing operation) using the trained model 132. Parameters of the trained model 132 and parameters of the trained model obtained by training the initial model 122 may be the same. In some embodiments, the trained model 132 and the trained model obtained by training the initial model 122 may be a same model. In some embodiments, the second computing system 130 may generate a result 150 based on the trained model 132, and the result 150 may be obtained by processing the data 140 using the trained model 132. For example, the trained model 132 may be a trained artifact removal model, and the result 150 may be a result obtained by processing an image using the trained artifact removal model (i.e., an image output by the trained artifact removal model).

A model (e.g., the initial model 122, the trained model 132, etc.) may refer to a combination of multiple algorithms performed based on a processing device. These algorithms may include a large amount of parameters. When the model operates, the parameters may be preset or dynamically adjusted. Some parameters may be obtained through training, and some parameters may be obtained during operation. In some embodiments, a process for training an initial model (e.g., process 200, process 300, process 600, etc.) may be executed by the first computing system 120 of the artifact removal system 100. For example, the process for training the initial model may be implemented as a set of instructions (e.g., an application) stored in a storage device (e.g., the storage device of the first computing system 120). In some embodiments, the first computing system 120 (e.g., the processor of the first computing system 120, and/or one or more modules illustrated in FIG. 7) may execute the set of instructions and may accordingly be directed to perform the process for training the initial model. In some embodiments, the process for training the initial model may be performed by another device or system other than the artifact removal system 100, e.g., a device or system of a vendor or a manufacturer of the initial model. For illustration purposes, the implementation of the process for training the initial model by first computing system 120 is described as an example.

Figure 2:
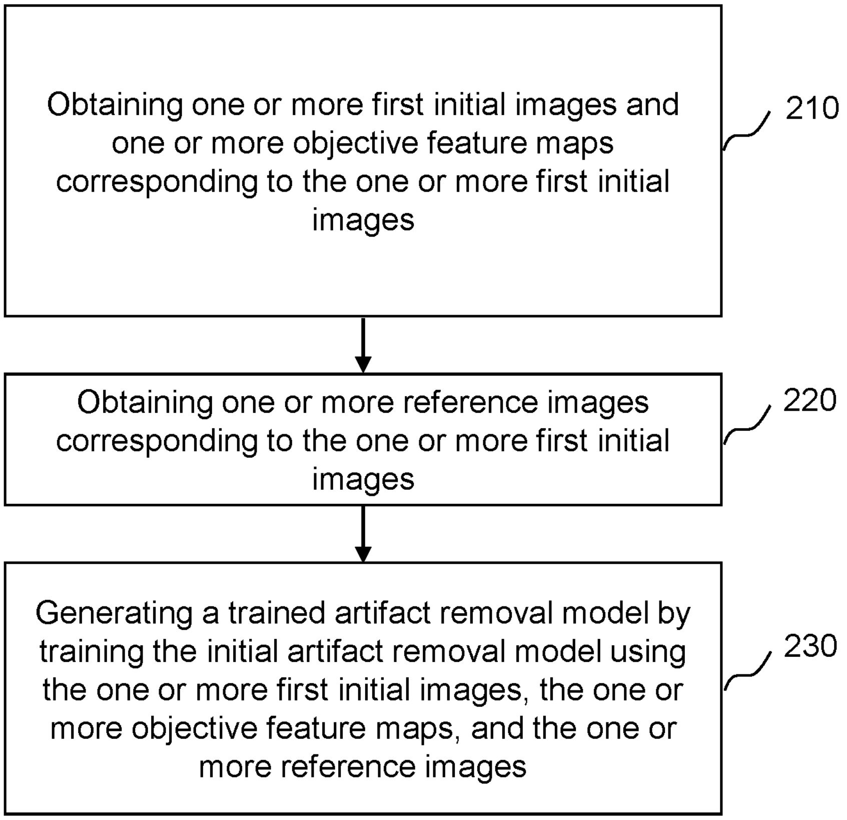
FIG. 2 is a flowchart illustrating an exemplary process for training an initial artifact removal model according to some embodiments of the present disclosure.

FIG. 2 is a flowchart illustrating an exemplary process for training an initial artifact removal model according to some embodiments of the present disclosure.

In 210, the first computing system 120 (e.g., the acquisition module 710) may obtain one or more first initial images and one or more objective feature maps corresponding to the one or more first initial images.

In some embodiments, a first initial image may include a two-dimensional (2D) image, a three-dimensional (3D) image, or the like. In some embodiments, the first initial image may include a medical image of a subject generated by a biomedical imaging technique. The subject may be biological or non-biological. For example, the subject may include a patient, a man-made object, etc. As another example, the subject may include a specific portion, an organ, and/or tissue of the patient. Specifically, the subject may include the head, the neck, the thorax, the heart, the stomach, a blood vessel, soft tissue, a tumor, or the like, or any combination thereof. In the present disclosure, “object” and “subject” are used interchangeably. For example, the first initial image may include an MR image, a PET image, a CT image, a PET-CT image, a PET-MR image, an ultrasound image, etc.

In some embodiments, the first initial image may be an industrial image or a phantom image, for example, a scanned image of a workpiece or phantom. Exemplary first initial images may include a digital radiography (DR) image, a computed tomography (CT) image, an emission computed tomography (ECT) image, a magnetic resonance imaging (MRI) image, an ultrasound image, a positron emission tomography (PET) image, or the like, or any combination thereof. It should be noted that although medical CT images are used as examples in the following descriptions, the embodiments of the present disclosure may also be used for artifact removing of other types of images, for example, industrial CT images, industrial MRI images, etc.

In some embodiments, each of the first initial image(s) may include one or more artifacts, such as one or more metallic artifacts, one or more motion artifacts. Merely by way of example, if foreign matter is disposed on or within the subject and/or a field of view (FOV) of an imaging device for acquiring the first initial image, the first initial image may include an artifact corresponding to the foreign matter. Foreign matter disposed on or within the subject may include one or more objects that are not naturally produced or grow by the subject but is on or inside the subject. Exemplary foreign matter may include metal (e.g., a metal zipper), a pathological stone, a swallowing diagnostic apparatus, a stent, calcified foreign matter (e.g., a fish bone, a chicken bone), or the like, or any combination thereof. For example, if a metal is disposed on or within the subject and/or the FOV of the imaging device for acquiring the first initial image, and an X-ray beam passes through the metal, then the X-ray beam may harden, and accordingly, noises, volume effects, and scattering effects may be exacerbated, which may cause metallic artifacts in the first initial image. In addition, during the scanning of the subject, a movement, a respiration, a heartbeat, a gastrointestinal motility, etc., of the subject may cause motion artifacts in the first initial image.

In some embodiments, the first initial image may be generated based on image data acquired using an imaging device. For example, the imaging device may be directed to scan the subject or a portion of the subject (e.g., the chest of the subject). the first initial image may be generated based on image data acquired by the imaging device. In some embodiments, the imaging device may include a single-modality scanner and/or multi-modality scanner. The single modality scanner may include, for example, an X-ray scanner, a CT scanner, an MRI scanner, an ultrasonography scanner, a PET scanner, a DR scanner, or the like, or any combination thereof. The multi-modality scanner may include, for example, an X-ray-MRI scanner, a PET-X-ray scanner, a single-photon emission computed tomography-magnetic resonance imaging (SPECT-MRI) scanner, a PET-CT scanner, etc. It should be noted that the imaging device described in the present disclosure is merely provided for illustration purposes, and not intended to limit the scope of the present disclosure. In some embodiments, the first initial image(s) may be previously generated and stored in a storage device (e.g., the storage device of the first computing system 120, or an external source). The first initial image(s) may be retrieved from the storage device.

In some embodiments, the first computing system 120 may also simulate and acquire the first initial image(s) through a simulation system or a simulation platform. This embodiment does not limit the acquisition of the first initial image. It should be noted that the acquisition of the first initial image(s) described in the present disclosure is merely provided for illustration purposes, and not intended to limit the scope of the present disclosure.

An objective feature map refers to a map or data that can reflect objective information relating to one or more artifacts in the corresponding first initial image. In some embodiments, the objective information may reflect features of the artifact(s) (also referred to as artifact features). For example, if a scan region of the subject is the head of the subject, the objective information may reflect that a location of the artifact(s) in the artifact features is the head of the subject in the corresponding first initial image. Exemplary objective information may include a type, a size, an intensity, a location, etc., of the artifact(s), an artifact rate, and scan parameters, a scan scene, window width and window level information, etc., of the corresponding first initial image, or the like, or any combination thereof. For example, the objective information related to a metallic artifact may include the type, the size, the location, etc., of the corresponding metal, and the scan parameters, the scanning scene, etc., of the corresponding first initial image. The type of metal refers to a type of metal that produces the metallic artifact, such as a copper, an iron, etc. The size of metal refers to an actual size of the metal that produces the metallic artifact. The location of metal refers to an actual position of the metal that produces the metal artifact relative to the subject during the scanning of the object. The scan parameters may be relative parameters during the scanning of the object, such as a scanning region of the subject, the FOV of the imaging device, a scan time, a scan voltage, a scan current, a window width, a window level, etc. The scan scene may include the current scan region.

In some embodiments, for each first initial image of the one or more first initial images, the first computing system 120 may obtain objective information (also referred to as first objective information) corresponding to the first initial image. In some embodiments, in order to facilitate an application of the objective information to model processing, the first computing system 120 may determine one or more numerical vectors by performing a vectorization processing on the objective information. Each type of objective information may correspond to one of the one or more numerical vectors. In some embodiments, each type of objective information may include multiple classifications, and each classification may be represented by a numerical value (e.g., 1, 2, 3, 4, 5, etc.). In some embodiments, an initial value of 0 may be set for each type of objective information. For example, the first initial image may correspond to four types of objective information a, b, c, and d, and the initial vector is [0, 0, 0, 0]. The objective information a may include three classifications, and the value of the objective information a may be one of the three classifications, such as 1, that is, the objective information a may be represented as a vector [1, 0, 0, 0]. The objective information b may include two classifications, and the value of the objective information b may be one of the two classifications, such as 2, that is, the objective information b may be represented as a vector [0, 2, 0, 0]. The objective information c may include four classifications, and the value of the objective information c can be one of the four classifications, such as 4, that is, the objective information c may be represented as a vector [0, 0, 4, 0]. The objective information d may include three classifications, and the value of the objective information d may be one of the three classifications, such as 3, that is, the objective information d may be represented as a vector [0, 0, 0, 3].

In some embodiments, if the first initial image corresponds to a plurality of types of objective information, the first computing system 120 may further perform vectorization processing on a combination of the plurality of types of objective information, so that a combination of any number of types of objective information may correspond to a numerical vector. For example, the combination of the four types of objective information a, b, c, and d may be expressed by a vector [1, 2, 4, 3].

In some embodiments, after the vectorization processing is performed, the objective information and the corresponding numerical vector(s) may be represented as a table to generate the objective feature map corresponding to the first initial image. For example, the objective information a, b, c, and d and the corresponding numerical vectors may form an objective feature map as shown in Table 1 below.

TABLE 1

Exemplary objective feature map

| Objective information | Information encoded in the channel |
|---|---|
| a | [1, 0, 0, 0] |
| b | [0, 2, 0, 0] |
| c | [0, 0, 4, 0] |
| d | [0, 0, 0, 3] |

In some embodiments, the first computing system 120 may obtain the objective information corresponding to the first initial image based on the first initial image, scan information of the first initial image (e.g., a scan protocol, scan parameters, etc.), and/or information related to the objective information received by a computing device (e.g., the first computing system 120, or the second computing system 130, etc.).

In some embodiments, the first computing system 120 may obtain a first portion of the objective information (e.g., the type, the size, the location of the metal) based on the first initial image. In some embodiments, the first portion of the objective information may be acquired manually by a user (e.g., by manually inputting corresponding objective information), so that the first computing system 120 may obtain the first portion of the objective information. For example, a user (e.g., a doctor) may annotate at least one piece of objective information in the first initial image. The first computing system 120 may obtain the first portion of the objective information based on the annotated first initial image. In some embodiments, the first computing system 120 may automatically obtain objective information through a simulation system or simulation platform. For example, the simulation system or simulation platform may identify the objective information included in the first initial image using an image recognition technology (e.g., by identifying a location of a metallic artifact in the first initial image to determine a location of the corresponding metal, by identifying a size of the metallic artifact in the first initial image to determine a size of the corresponding metal, etc.).

In some embodiments, the first computing system 120 may obtain a second portion of the objective information based on scan information of the first initial image (e.g., a scan protocol, scan parameters, etc.). For example, the first computing system 120 may obtain and analyze the scan protocol, the scan parameters, and/or other information of the first initial image, and automatically collect relevant objective information (e.g., the scan current is 200 mA and the scan voltage is 100 kV).

In some embodiments, the first computing system 120 may obtain a third portion of the objective information based on the information related to the objective information received by a computing device (e.g., the first computing system 120, or the second computing system 130, etc.). For example, for a metallic artifact, a user may determine the type and the location of the corresponding metal through a clinical experience, and input the determined type and location of the corresponding metal into the computing device for storage. The first computing system 120 may obtain the third portion of the objective information from the computing device.

In some embodiments, the first computing system 120 may transform the objective information into one or more word vectors based on a feature mapping dictionary. Then, the first computing system 120 may generate an objective feature map corresponding to the first initial image by combining the one or more word vectors. The feature mapping dictionary may be a table containing a mapping relationship between objective information and numerical vectors. In some embodiments, the first computing system 120 may directly obtain the word vector(s) through the feature mapping dictionary. For example, if a type of objective information is an artifact scan protocol, a numerical vector (e.g., a vector [0, 2, 0]) corresponding to the artifact scan protocol may be obtained by searching the feature mapping dictionary.

In some embodiments, the first computing system 120 may perform a mapping processing on the objective information to obtain the word vector(s) based on the mapping relationship in the feature mapping dictionary, and arrange the one or more word vectors in a preset order to obtain the corresponding objective feature map.

In some embodiments, each objective feature map of the one or more objective feature maps may be obtained using a trained objective feature map determination model. More descriptions for obtaining of an objective feature map using the trained objective feature map determination model may be found elsewhere in the present disclosure (e.g., FIG. 5 and the descriptions thereof).

In 220, the first computing system 120 (e.g., the acquisition module 710) may obtain one or more reference images corresponding to the one or more first initial images.

A reference image refers to an image obtained by removing artifacts (e.g., metallic artifacts) in a first initial image and can be used as a ground truth (also referred to as a label) for training the initial artifact removal model. Each of the reference image(s) may correspond to one of the first initial image(s).

In some embodiments, the reference image(s) may be generated using other artifact removal models, a simulation system, or a simulation platform. The reference image(s) may be stored in a storage device (e.g., the storage device of the first computing system 120, or an external source). The first computing system 120 may retrieve the reference image(s) from the storage device.

In 230, the first computing system 120 (e.g., the model generation module 720) may generate a trained artifact removal model by training the initial artifact removal model using the first initial image(s), the objective feature map(s), and the reference image(s).

In some embodiments, the initial artifact removal model and/or the trained artifact removal model may include, but are not limited to, a deep learning model, a machine learning model, or the like. For example, the initial artifact removal model and/or the trained artifact removal model may include a U-shaped network (U-Net) model, a dense convolutional network (DenseNet) model, a residual network (ResNet) model, a generative adversarial network (GAN) model, etc.

In some embodiments, the first computing system 120 may obtain one or more preliminary correction images corresponding to the one or more first initial images. A preliminary correction image corresponding to a first initial image refers to an image obtained by correcting the first initial image using a physical correction algorithm. Exemplary physical correction algorithms may include a metallic artifact reduction (MAR) algorithm, a hardening correction algorithm, or the like. The preliminary correction image may include a 2D image, a 3D image, or the like.

In some embodiments, for each of the preliminary correction image(s), the first computing system 120 may acquire the preliminary correction image by performing a physical correction on a corresponding first initial image. In some embodiments, the first computing system 120 may acquire the preliminary correction image from a storage device (e.g., the storage device of the first computing system 120, or an external source).

In some embodiments, the first computing system 120 may generate the trained artifact removal model by training the initial artifact removal model using the one or more first initial images, the one or more preliminary correction images, the one or more objective feature maps, and the one or more reference images.

For illustration purposes, the training of the initial artifact removal model using the first initial image(s), the preliminary correction image(s), the objective feature map(s), and the reference image(s) is described hereinafter. The first computing system 120 may input the first initial image(s), the preliminary correction image(s), and the objective feature map(s) into the initial artifact removal model for training. The first computing system 120 may use the first initial image(s) as first training samples, and use the reference image(s) as first labels corresponding to the first training samples, and adjust one or more parameters of the initial artifact removal model based on the one or more objective feature maps and the first labels. A first label of a first training sample may refer to a desire output image of the initial artifact removal model corresponding to the first training sample.

In some embodiments, the initial artifact removal model may be trained by one or more model training algorithms. Exemplary model training algorithms may include a gradient descent algorithm, a stochastic gradient descent algorithm, a Newton's algorithm, or the like.

In some embodiments, the training of the initial artifact removal model may include one or more times of training. During each time of training, the first computing system 120 may input a first initial image, a preliminary correction image corresponding to the first initial image, and an objective feature map corresponding to the first initial image into the initial artifact removal model for training. The first computing system 120 may use the first initial image as a first training sample, and use the reference image as a first label corresponding to the first training sample, and adjust one or more parameters of the initial artifact removal model based on the objective feature map and the first label.

In some embodiments, during each time of training, the objective feature map may not be processed (or changed) by the initial artifact removal model, but used to adjust the parameters of the initial artifact removal model, that is, the objective feature map may be used as a hyper-parameter of the initial artifact removal model. For example, an objective feature map may include information of window width and window level. After the objective feature map is input into the initial artifact removal model, during the training of the artifact removal model, the initial artifact removal model may adjust the window widths and window levels of the initial image, the preliminary correction image, and the target image based on the information of window width and window level included in the objective feature map. For example, the initial artifact removal model may adjust the window widths and window levels of the initial image, the preliminary correction image, and the target image to be the same as the window width and window level included in the objective feature map, respectively. In this way, the objective feature map may be used as the hyper-parameter of the initial artifact removal model to update the parameters of the initial artifact removal model, thereby improving the performance of the initial artifact removal model.

In some embodiments, during each time of training, the vectors corresponding to the first training sample, the preliminary correction image, and the objective feature map may be input into the initial artifact removal model, and the initial artifact removal model may combine the first training sample (i.e., the first initial image) and the preliminary correction image into a combined vector. Since the initial artifact removal model may be various types of multi-layer neural networks, the combined vector may be applied to each layer of the initial artifact removal model during the training. The initial artifact removal model may output a predicted target image based on the combined vector. Then, the parameters of the initial artifact removal model may be adjusted based on a value of a first loss function and the objective feature map. The first loss function may be used to measure a discrepancy between a target image predicted by the initial artifact removal model and the first label. During the training of the initial artifact removal model, a weight may be assigned to the discrepancy based on the objective feature map to realize the biased training of the initial artifact removal model, so that the trained artifact removal model may be used to remove a type of artifacts corresponding to the objective feature map, and not easily affected by other types of artifacts. In some embodiments, an inverse adjustment process of the initial artifact removal model may include one or more iterations to iteratively update the parameters of the initial artifact removal model. During each iteration, the parameters of the initial artifact removal model may be adjusted and the adjusted parameters may be used as the parameters for a next iteration for training.

In some embodiments, if the training of the initial artifact removal model satisfies a first termination condition, the training of the initial artifact removal model may be terminated, and an updated artifact removal model in the current training may be designated as a trained artifact removal model. Exemplary first termination conditions may include that the value of the first loss function obtained in the certain training is less than a threshold value, that a certain count of trainings has been performed, that the first loss function converges such that the difference of the values of the first loss function obtained in a previous training and the current training is within a threshold value, a prediction accuracy of the updated artifact removal model is greater than an accuracy threshold, etc.

According to some embodiments of the present disclosure, during the training process, the first initial image and the preliminary correction image may be combined into a combined vector, and applied to the training of the initial artifact removal model. In this way, the preliminary correction image may be used as a correct guide for the training of the initial artifact removal model, thereby reducing the amount of data processing during the training process and improving the accuracy of the trained artifact removal model for removing artifacts. Moreover, each objective feature map may include objective information of artifacts and may be used as a hyper-parameter of the initial artifact removal model to adjust the parameters of the initial artifact removal model during training, which may improve the pertinence and bias of the trained artifact removal model for removing artifacts, thereby greatly improving the generalization ability of the trained artifact removal model.

It should be noted that the above description regarding the process 200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 200 may be accomplished with one or more additional operations not described and/or without one or more of the operations discussed above.

In some embodiments, the training of the initial artifact removal model may further include acquiring an initial objective feature map determination model, and training the initial objective feature map determination model and the initial artifact removal model synchronously. An input of the initial objective feature map determination model may be a word vector corresponding to the objective information, and an output of the initial objective feature map determination model may be an objective feature map. More descriptions for the synchronous training of the initial objective feature map determination model and the initial artifact removal model may be found elsewhere in the present disclosure (e.g., FIG. 3 and the descriptions thereof).

In some embodiments, the first computing system 120 may obtain an initial objective feature map determination model. The first computing system 120 may further train the initial objective feature map determination model and the initial artifact removal model synchronously. In some embodiments, one or more word vectors corresponding to objective information of each first initial image of the first initial image(s) may be input into the initial objective feature map determination model. The initial objective feature map determination model may output an objective feature map corresponding to the each first initial image.

In some embodiments, during the synchronous training of the initial objective feature map determination model and the initial artifact removal model, parameters of one of the two models (also referred to as a first model, such as the initial objective feature map determination model) may be remained unchanged, and the other model (also referred to as a second model) may be trained. In some embodiments, the first model and the second model may be trained in turn. For example, if one or more times of training of the second model are completed, then one or more times of training of the first model may be performed to ensure that the effect of the synchronous training of the two models is optimal. In some embodiments, the first computing system 120 may first remain the parameters of the initial objective feature map determination model unchanged, that is, the initial objective feature map determination model may be not trained until one or more times of training of the initial artifact removal model is completed. In some embodiments, the first computing system 120 may input the objective feature map output by the initial objective feature map determination model into the initial artifact removal model to train the initial artifact removal model and adjust parameters of the initial artifact removal model. If an updated artifact removal model obtained after one or more times of training satisfies a preset condition, the training of the initial artifact removal model may be terminated or suspended, that is, the parameters of the updated artifact removal model may be remained unchanged, and the initial objective feature map determination model may be trained and the parameters of the initial objective feature map determination model may be adjusted. Exemplary preset conditions may include that the value of a loss function (e.g., the first loss function) obtained in the training is less than a threshold value, that a preset times of training has been performed, that the loss function converges such that the difference of the values of the loss function obtained in a previous training and a current training is within a threshold value, etc.

In some embodiments, the training of the initial objective feature map determination model and the initial artifact removal model may be alternately performed one or more times until the synchronous training satisfies a second termination condition. If the second termination condition is satisfied, the synchronous training may be terminated, and the updated artifact removal model and the updated objective feature map determination model may be designated a trained artifact removal model and a trained objective feature map determination model, respectively. In some embodiments, the second termination conditions may include a condition that satisfies both the termination condition for the training of the initial artifact removal model (i.e., the first termination condition described in FIG. 2) and the termination condition for the training of initial objective feature map determination model (i.e., the fourth termination condition described in FIG. 6).

In some embodiments, the training samples for training the initial artifact removal model and the training samples for training the initial objective feature map determination model may come from different acquisition batches. For example, the training samples for training the initial artifact removal model may be obtained from a first batch of clinical images, and the training samples for training the initial objective feature map determination model may be obtained from a second batch of clinical images. In this way, the initial artifact removal model and the initial objective feature map determination model may be separately trained through different batches of training samples, so that the two models may learn more data relating to artifacts during the synchronous training to improve the generalization ability of the trained artifact removal model and the trained objective feature map determination model.

Figure 3:
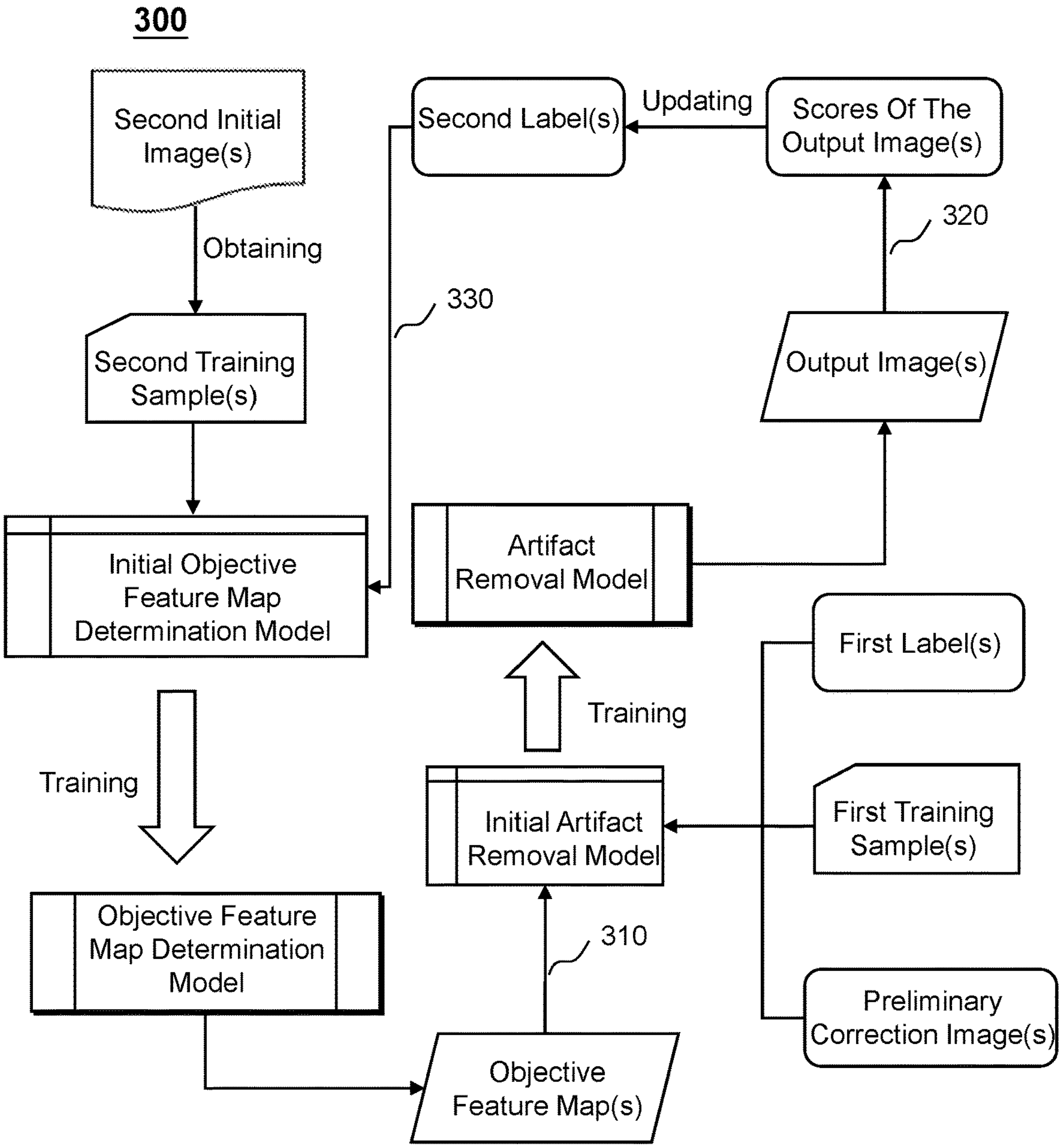
FIG. 3 is a flowchart illustrating an exemplary process for training an initial artifact removal model and an initial objective feature map determination model synchronously according to some embodiments of the present disclosure.

FIG. 3 is a flowchart illustrating an exemplary process for training an initial artifact removal model and an initial objective feature map determination model synchronously according to some embodiments of the present disclosure.

In 310, for each time of one or more times of first training during the synchronous training, the first computing system 120 (e.g., the model generation module 720) may input the objective feature map output by the (initial) objective feature map determination model to the initial artifact removal model, and adjust parameters of the initial artifact removal model bases on an output of the initial artifact removal model, while remaining parameters of the (initial) objective feature map determination model unchanged.

More descriptions for the training of the initial artifact removal model may be found elsewhere in the present disclosure (e.g., FIG. 2 and the descriptions thereof).

In 320, for each time of the one or more times of first training during the synchronous training, the first computing system 120 (e.g., the model generation module 720) may determine a score of the output of the initial artifact removal model.

A score may reflect how a user (e.g., a doctor) or a model (e.g., the initial objective feature map model) evaluates the output of the initial artifact removal model. The output of the initial artifact removal model may be an image predicted by the initial artifact removal model (also referred to as a predicted image or an output image). The score may reflect a degree of artifact removal of the output image relative to the corresponding first initial image. Since the training of the initial artifact removal model has not been completed, the output of the initial artifact removal model may not meet the requirements of artifact removal during the training process. The output of the initial artifact removal model may be evaluated to determine the performance of the current artifact removal model. In some embodiments, the score may be a numerical value, such as a score of 1 to 5, and the higher the score is, the better the performance of the current artifact removal model may be. In some embodiments, the score may be determined based on an artifact degree of the predicted image, a display quality of the tissue or organ structures of the subject in the predicted image, the diagnosability of a lesion of the subject in the predicted image, or the like. For example, the lower the artifact degree of the predicted image is, the higher the display quality of the tissue or organ structures of the subject in the predicted image is, and the higher the diagnosability of the lesion of the subject in the predicted image is, the higher the corresponding score may be.

In some embodiments, the first computing system 120 may obtain the score based on a user input. For example, a user may input a score into the artifact removal system 100, and the first computing system 120 may directly obtain the score input by the user.

In some embodiments, if one or more times of first training are completed, the first computing system 120 may perform operation 330.

In 330, for each time of one or more times of second training during the synchronous training, the first computing system 120 (e.g., the model generation module 720) may designate the score as a second label to train the (initial) objective feature map determination model and the initial (or updated) artifact removal model synchronously, and adjust parameters of the (initial) objective feature map determination model based on the second label, while remaining parameters of the initial (or updated) artifact removal model unchanged.

As aforementioned, each objective feature map may include objective information of artifacts and may be used as a hyper-parameter of the initial (or updated) artifact removal model to adjust the parameters of the initial (or updated) artifact removal model during training, which may improve the pertinence and bias of the trained artifact removal model for removing artifacts, thereby greatly improving the generalization ability of the trained artifact removal model. Therefore, the higher the accuracy of the objective feature map, the higher the accuracy of the predicted image output by the initial (or updated, or trained) artifact removal model may be.

In some embodiments, in the synchronous training of the initial objective feature map determination model and the initial artifact removal model, the second label may be updated based on the score of the output of the initial (or updated) artifact removal model. With the multiple times of training of the initial artifact removal model, the performance of the artifact removal model may be gradually improved, and the score of the output of the artifact removal model may be improved, that is, the accuracy of the second label may be gradually improved, thereby improving the accuracy of the training of the (initial) objective feature map determination model.

In some embodiments, a first initial sample used in operation 310 may be again input into the artifact removal model to obtain a new score corresponding to the first initial sample. As the times of the training increase, the performance of the artifact removal model may be improved, and thus, the new score corresponding to the first initial image may be more accurate. The first computing system 120 may update the second label corresponding to the first initial image according to the new score.

In some embodiments, the first computing system 120 may obtain a second initial image that is different from the first initial image(s), and objective information corresponding to the second initial image. The first computing system 120 may input the second initial image and other information (e.g., a preliminary correction image and an objective feature map corresponding to the second initial image) into the artifact removal model, and the artifact removal model may output a predict image corresponding to the second initial image. A score corresponding to the second initial image may be determined based on the predicted image corresponding to the second initial image. The first computing system 120 may designate the score corresponding to the second initial image as a second label, and the objective information corresponding to the second initial image as a second training sample to train the (initial) objective feature map determination model, while remaining parameters of the artifact removal model unchanged. More descriptions for the training of the initial objective feature map determination model may be found elsewhere in the present disclosure (e.g., FIG. 6 and the descriptions thereof).

According to some embodiments of the present disclosure, during the synchronous training of the objective feature map determination model and the artifact removal model, the score of the predicted image output by the artifact removal model may be used as the second label of the training of the objective feature map determination model. With the increase of the times of training, the accuracy of the second label may be gradually improved, thereby improving the accuracy of the training of the objective feature map determination model.

In some embodiments, the trained artifact removal model may include two or more artifact removal sub-models. In some embodiments, the two or more artifact removal sub-models may be used for removing artifacts of different classifications. In some embodiments, an artifact may be classified based on a position, a nature, etc., of the artifact. For example, based on the position of the artifact, the artifact may be classified as an artifact of the head, an artifact of the chest, an artifact of the abdomen, etc. As another example, based on the nature of the artifact, the artifact may be classified as a metallic artifact, a motion artifact, etc. Merely by way of example, the trained artifact removal model may include two artifact removal sub-models A and B. The artifact removal sub-model A may be used for removing iron artifacts, and the artifact removal sub-model B may be used for removing artifacts of the head. Therefore, suitable objective feature maps may be used for training a specific initial artifact removal sub-model, so that the trained artifact removal sub-model may be used for removing specified artifacts. In some embodiments, the different artifact removal sub-models may include the same or different types of neural network models. For example, the artifact removal sub-model A may be a U-Net model, and the artifact removal sub-model B may be a DenseNet model.

Accordingly, in some embodiments, the trained objective feature map determination model may include a classification model. A classification result output by the classification model may be configured to indicate a target artifact removal sub-model among the two or more artifact removal sub-models used for artifact removal. In some embodiments, the classification model may include a multi-layer perception (MLP) model, a decision tree (DT) model, a deep neural network (DNN) model, a support vector machine (SVM) model, a K-nearest neighbor (KNN) model, or the like.

In some embodiments, an input of the classification model may be an objective feature map output by the objective feature map determination model, and an output of the classification model may be a classification result indicating the target artifact removal sub-model among the two or more artifact removal sub-models used for artifact removal. In some embodiments, the output of the classification model may be a numerical value. For example, the number 1 may be used to represent that the target artifact removal sub-model is the artifact removal sub-model A, and the number 2 may be used to represent that the target artifact removal sub-model is the artifact removal sub-model B.

In the way, the trained artifact removal model can have diversified processing functions through multiple artifact removal sub-models, and a target artifact removal sub-model that is capable of achieving the optimal artifact removal may be determined through the classification result of the trained objective feature map determination model, which may improve the accuracy and efficiency of image processing performed by the trained artifact removal model.

Figure 4:
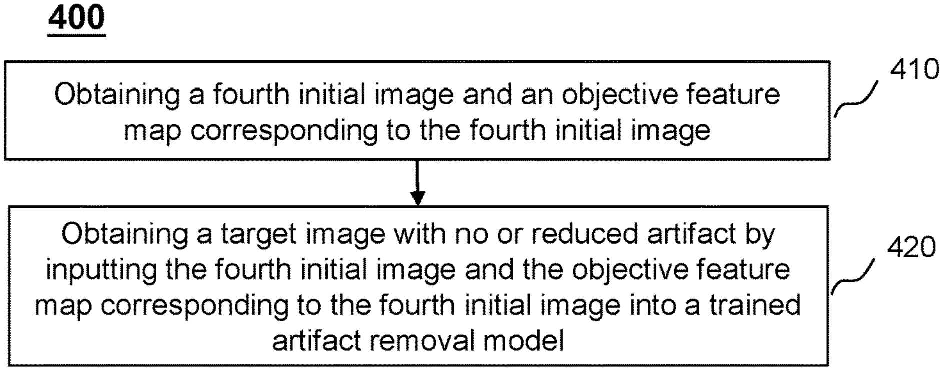
FIG. 4 is a flowchart illustrating an exemplary process for artifact removing according to some embodiments of the present disclosure.
Figure 8:
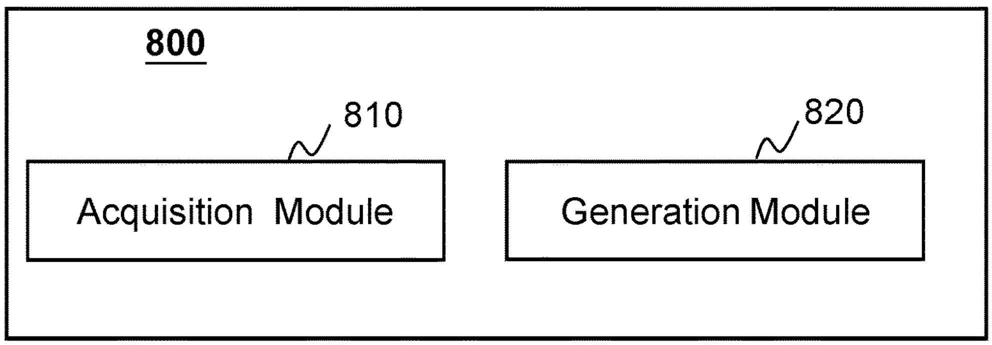
FIG. 8 is a block diagram illustrating an exemplary second computing system 130 according to some embodiments of the present disclosure.

FIG. 4 is a flowchart illustrating an exemplary process for artifact removing according to some embodiments of the present disclosure. In some embodiments, the process 400 may be implemented in the artifact removal system 100 illustrated in FIG. 1. For example, the process 400 may be stored in the storage device of the artifact removal system 100 as a form of instructions, and invoked and/or executed by the second computing system 130 (e.g., one or more modules as illustrated in FIG. 8). The operations of the illustrated process presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 410, the second computing system 130 (e.g., the acquisition module 810) may obtain a fourth initial image and an objective feature map corresponding to the fourth initial image.

In some embodiments, the objective feature map may include objective information relating to one or more artifacts in the fourth initial image. In some embodiments, the second computing system 130 may obtain the objective information corresponding to the fourth initial image. The second computing system 130 may transform the objective information corresponding to the fourth initial image into one or more word vectors based on a feature mapping dictionary. The second computing system 130 may further generate the objective feature map corresponding to the fourth initial image by combining the one or more word vectors. In some embodiments, the objective feature map may be obtained using a trained objective feature map determination model. For example, the trained objective feature map determination model may include an objective information acquisition unit and an objective feature map generation unit. The second computing system 130 may input the fourth initial image into the objective information acquisition unit to obtain the objective information corresponding to the fourth initial image. The second computing system 130 or the trained objective feature map determination model may transform the objective information into one or more word vectors based on a feature mapping dictionary. The objective feature map may be generated by inputting the one or more word vectors corresponding to the objective information into the objective feature map generation unit.

In some embodiments, the obtaining of the fourth initial image and the objective feature map corresponding to the fourth initial image may be performed in a similar manner as that of the first initial image(s) and the objective feature map(s) corresponding to the first initial image(s) described in operation 210 in FIG. 2, and the descriptions thereof are not repeated here.

In 420, the second computing system 130 (e.g., the generation module 820) may obtain a target image with no or reduced artifact by inputting the fourth initial image and the objective feature map corresponding to the fourth initial image into a trained artifact removal model.

In some embodiments, the trained artifact removal model may be obtained according to the process 200 or the process 300.

In some embodiments, the second computing system 130 may obtain a preliminary correction image corresponding to the fourth initial image. In some embodiments, the second computing system 130 may acquire the preliminary correction image corresponding to the fourth initial image by performing a physical correction algorithm on the fourth initial image. In some embodiments, the second computing system 130 may acquire the preliminary correction image corresponding to the fourth initial image from a storage device (e.g., the storage device of the second computing system 130, or an external source). In some embodiments, the obtaining of the preliminary correction image corresponding to the fourth initial image may be performed in a similar manner as that of the preliminary correction image(s) corresponding to the one or more first initial images described in operation 230 in FIG. 2, and the descriptions thereof are not repeated here. In some embodiments, the second computing system 130 may obtain the target image with no or reduced artifact by inputting the initial image, the preliminary correction image, and the objective feature map into the trained artifact removal model.

The target image refers to an image obtained by partially or completely removing the artifacts in the fourth initial image. Merely by way of example, the fourth initial image, the preliminary correction image corresponding to the fourth initial image, and the objective feature map corresponding to the fourth initial image may be input into the trained artifact removal model, and the trained artifact removal model may directly output the target image.

In some embodiments, the objective feature map may be configured to facilitate the trained artifact removal model to remove one or more artifacts corresponding to the objective information represented by the objective feature map. The objective feature map may be used as a hyper-parameter of the trained artifact removal model, that is, the objective feature map may not be processed (or changed) by the trained artifact removal model, but be used to adjust other relating data. Merely by way of example, the objective feature map corresponding to the fourth initial image may include information of window width and window level. The second computing system 130 may adjust window widths and window levels of the fourth initial image, the preliminary correction image, and the target image using the trained artifact removal model based on the information of window width and window level included in the objective feature map corresponding to the fourth initial image. For example, the trained artifact removal model may adjust the window widths and window levels of the fourth initial image, the preliminary correction image corresponding to the fourth initial image, and the target image to be the same as the window width and window level included in the objective feature map. In this way, the objective feature map may be used as the hyper-parameter of the initial artifact removal model to update the parameters of the artifact removal model, thereby improving the performance of the artifact removal model. In this way, the optimal window width and window level information may be retained, thereby improving the accuracy of artifact removal.

In some embodiments, the trained artifact removal model may include two or more artifact removal sub-models. The second computing system 130 may determine a target sub-model among the two or more artifact removal sub-models based on the objective feature map. The second computing system 130 may further obtain the target image with no or reduced artifact by inputting the initial image, the preliminary correction image, and the objective feature map into the target sub-model. More descriptions for the obtaining of the target image with no or reduced artifact using the target sub-model may be found elsewhere in the present disclosure (e.g., FIG. 3 and the descriptions thereof).

In some embodiments, the objective feature map includes information relating to a degree of artifact removal. As used herein, the degree of artifact removal refers to a degree indicating to which extent the artifact(s) in the fourth initial image are removed. The degree of artifact removal may reflect a difference between artifact(s) in an image (e.g., the target image) obtained by performing an artifact removal on the fourth initial image and artifact(s) in the fourth initial image. In some embodiments, the degree of artifact removal may be represented in various forms. For example, the degree of artifact removal may include a low-removal degree, a moderate-removal degree, and a high-removal degree. As another example, the degree of artifact removal may be represented as a score, and a greater score may indicate a higher degree of artifact removal. For example, if the degree of artifact removal is in a range of 0-1, the degree of artifact removal corresponding to the fourth initial image may be 0, and the degree of artifact removal corresponding to the target image with no artifact may be 1.

In some embodiments, the information relating to the degree of artifact removal included in the objective feature map may be the degree of artifact removal of an initial image or a replacement image for the initial image (e.g., the target image).

In some embodiments, the second computing system 130 may determine a score of the target image. The score may reflect or be associated with the degree of artifact removal. In some embodiments, the second computing system 130 may determine a similarity between the target image and the initial image. The second computing system 130 may further determine the score of the target image based on the similarity between the target image and the initial image. The greater the similarity between the target image and the initial image is, the smaller the score may be. Alternatively, the greater the similarity between the target image and the initial image is, the larger the score may be.

In some embodiments, the second computing system 130 may determine a similarity between a first region of the target image and a second region of the fourth initial image. The second region of the fourth initial image refers to a region that includes one or more artifacts in the fourth initial image. The first region of the target image and the second region of the fourth initial image may correspond to a same physical region. In some embodiments, the second computing system 130 may extract image features of the first region of the target image and image features of the second region of the fourth initial image. Exemplary image features may include color features, shape features, size features, etc. For example, the second computing system 130 may extract image features of the first region of the target image and image features of the second region of the fourth initial image using a feature extraction algorithm. Exemplary feature extraction algorithms may include a scale invariant feature transform (SIFT) algorithm, an average amplitude difference function (AMDF) algorithm, a histogram of gradient (HOG) algorithm, a speeded up robust features (SURF) algorithm, a local binary pattern (LBP) algorithm, etc. The second computing system 130 may determine the similarity between the first region and the second region based on the image features of the first region of the target image and image features of the second region of the fourth initial image, and designate the similarity between the first region and the second region as the similarity between the target image and the initial image. In some embodiments, the second computing system 130 may determine the similarity between the target image and the initial image using a similarity algorithm. Exemplary similarity algorithms may include a Euclidean distance algorithm, a Manhattan distance algorithm, a Minkowski distance algorithm, a cosine similarity algorithm, a Jaccard similarity algorithm, a Pearson correlation algorithm, or the like, or any combination thereof.

In some embodiments, the second computing system 130 may determine whether to further process the target image based on the score. For example, the second computing system 130 may determine whether the score exceeds a score threshold. In response to a determination that the score exceeds the score threshold (or alternatively does not exceed the score threshold), the second computing system 130 may determine that the target image is not to be further processed. In response to a determination that the score does not exceed the score threshold (or alternatively exceeds the score threshold), the second computing system 130 may determine that the target image is to be further processed.

In some embodiments, in response to a determination that the target image is to be further processed, the second computing system 130 may update the objective feature map based on the score to obtain an updated objective feature map. The second computing system 130 may update the information relating to the degree of artifact removal in the objective feature map based on the score and remain the remaining information of the objective feature map unchanged. For example, if the information relating to the degree of artifact removal in the objective feature map is represented using the score, the second computing system 130 may replace the information relating to the degree of artifact removal in the objective feature map using the score.

The second computing system 130 may further obtain an updated target image by inputting the target image, the preliminary correction image corresponding to the initial fourth image, and the updated objective feature map into the trained artifact removal model.

In some embodiments, the trained artifact removal model may include a scoring unit configured to determine the score of the target image, and the trained artifact removal model may output the target image and the score of the target image. In some embodiments, the trained artifact removal model may further include a determination unit configured to determine whether to further process the target image based on the score. In response to a determination that the target image is not to be further processed, the trained artifact removal model may directly output the target image. In response to a determination that the target image is to be further processed, the trained artifact removal model may perform one or more iterations until a third termination condition is satisfied. In each iteration, the determination unit may update the objective feature map based on the score to obtain an updated objective feature map, and input the target image, the preliminary correction image corresponding to the initial fourth image, and the updated objective feature map into an input layer of the trained artifact removal model to obtain an updated target image. Exemplary third termination conditions may include that a certain count of iterations has been performed, that the score of the target image in a current iteration exceeds the score threshold, etc. If the third termination condition is satisfied, the trained artifact removal model may directly output the target image in the current iteration.

In some embodiments, the information relating to the degree of artifact removal included in the objective feature map may be a desired degree of artifact removal corresponding to an output image of the trained artifact removal model. In some embodiments, the second computing system 130 may obtain an instruction through a user interface. The instruction may indicate the score of the target image or information relating to adjustment of the degree of artifact removal. The second computing system 130 may update the objective feature map based on the instruction to obtain an updated objective feature map. For example, if the instruction indicates that the score of the target image or the degree of artifact removal of the target image is too large, the second computing system 130 may reduce a value of the degree of artifact removal in the objective feature map to obtain the updated objective feature map. As another example, if the instruction indicates that the desired degree of artifact removal of the target image is a certain value, the second computing system 130 may directly update the value of the degree of artifact removal in the objective feature map with the certain value to obtain the updated objective feature map. The second computing system 130 may obtain an updated target image by inputting the target image, the preliminary correction image corresponding to the fourth initial image, and the updated objective feature map into the trained artifact removal model. In this way, different target images may be obtained based on different user instructions, which may satisfy requirements of different users, thereby providing a better usability and interactivity.

As described elsewhere in this disclosure, a conventional artifact removal approach using a machine learning model does not using information relating to artifacts (e.g., sizes, natures, etc., of the artifacts), which has low accuracy and a poor effect of removing artifacts. Compared with the conventional artifact removal approach, according to some embodiments of the present disclosure, a more accurate target image with no or reduced artifact may be obtained by inputting the fourth initial image, the preliminary correction image corresponding to the fourth initial image, and the objective feature map corresponding to the fourth initial image into the trained artifact removal model, thereby improving the accuracy of the artifact removal. In some embodiments, the target image may be further processed to obtain the updated target image, which may have a higher accuracy compared to the target image, thereby further improving the accuracy of the artifact removal.

It should be noted that the above description regarding the process 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 400 may be accomplished with one or more additional operations not described and/or without one or more of the operations discussed above.

Figure 5:
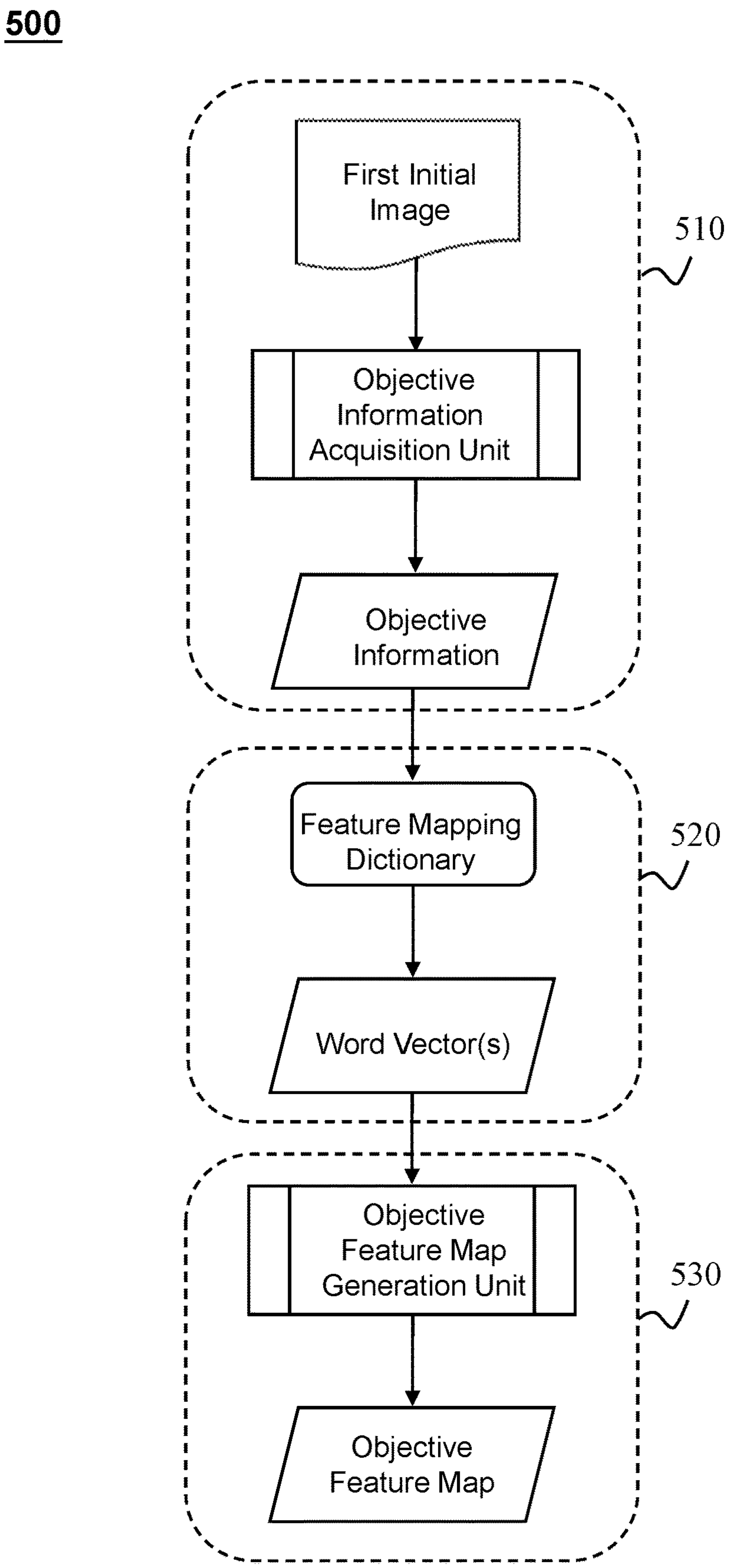
FIG. 5 is a flowchart illustrating an exemplary process for obtaining an objective feature map based on an initial image according to some embodiments of the present disclosure.

FIG. 5 is a flowchart illustrating an exemplary process for obtaining an objective feature map based on an initial image according to some embodiments of the present disclosure. In some embodiments, the process 500 may be performed by the second computing system 130.

In some embodiments, the objective feature map may be obtained using a trained objective feature map determination model. The trained objective feature map determination model may be generated according to the process 600 or the process 300. In some embodiments, the trained objective feature map determination model may include an objective information acquisition unit and an objective feature map generation unit. In some embodiments, the objective feature map generation unit may include a U-Net, a DenseNet, a ResNet, a GAN, or the like.

In 510, the second computing system 130 (e.g., the acquisition module 810) may input the first initial image into the objective information acquisition unit to obtain objective information corresponding to the first initial image. In some embodiments, the objective information acquisition unit may identify the objective information included in the first initial image through an image recognition technology. For example, the objective information acquisition unit may first identify a location (e.g., the chest) of an artifact in the first initial image, and then further identify other objective information such as a nature of the artifact (e.g., a copper metal), a size of the artifact (e.g., 3 mm), etc. In some embodiments, the input of the objective information acquisition unit may be a first initial image annotated by a user (e.g., a doctor). For example, the doctor may annotate a comment containing objective information corresponding to the first initial image (e.g., the location and the size, etc., of the artifact, scan parameters, a scan scene, etc., of the first initial image), and the objective information acquisition unit may obtain the objective information according to the comment. In some embodiments, the obtaining of objective information by the objective information acquisition unit may be performed in a similar manner as that of the objective information by the first computing system 120 in operation 210 in FIG. 2, and the descriptions thereof are not repeated here.

In 520, the second computing system 130 (e.g., the generation module 820) may transform the objective information into one or more word vectors based on a feature mapping dictionary. More descriptions for the transforming of the objective information into the one or more word vectors based on the feature mapping dictionary may be found elsewhere in the present disclosure. See, e.g., operation 210 in FIG. 2 and relevant descriptions thereof. In some embodiments, the operation 520 may be performed by the trained objective feature map determination model, such as the objective information acquisition unit or another portion (e.g., a word vector generation unit) of the trained objective feature map determination model.

In 530, the objective feature map may be generated by inputting the one or more word vectors corresponding to the objective information to the objective feature map generation unit. In some embodiments, the input of the objective feature map generating unit may be one or more word vectors of objective information, and the output may be an objective feature map. In some embodiments, the second computing system 130 may generate the objective feature map in a similar manner as the first computing system 120. For example, the second computing system 130 may convert the objective information into one or more word vectors and combine them to obtain an objective feature map based on the feature mapping dictionary. More descriptions for the obtaining of the objective feature map may be found elsewhere in the present disclosure. See, e.g., operation 210 in FIG. 2 and relevant descriptions thereof.

Figure 6:
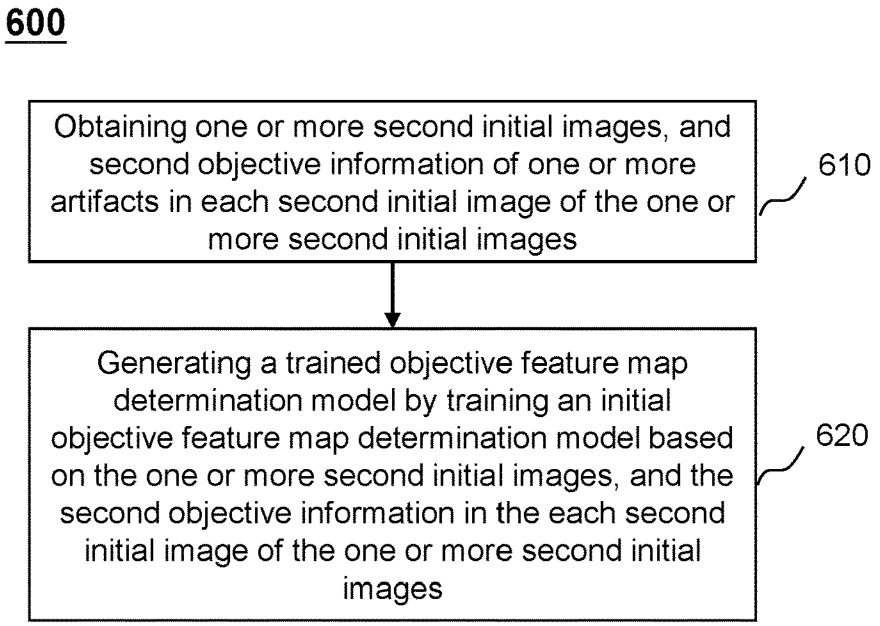
FIG. 6 is a flowchart illustrating an exemplary process for training an initial objective feature map determination model according to some embodiments of the present disclosure.

FIG. 6 is a flowchart illustrating an exemplary process for training an initial objective feature map determination model according to some embodiments of the present disclosure.

In 610, the first computing system 130 (e.g., the acquisition module 710) may obtain one or more second initial images, and second objective information of one or more artifacts in each second initial image of the one or more second initial images.

In some embodiments, the obtaining of the one or more second initial images and the second objective information of one or more artifacts in each second initial image may be performed in a similar manner as that of the one or more first initial images and the objective information corresponding to the one or more first initial images as described in operation 210 in FIG. 2, and the descriptions thereof are not repeated here.

In 620, the first computing system 120 (e.g., the model generation module 720) may generate a trained objective feature map determination model by training an initial objective feature map determination model based on the one or more second initial images, and the second objective information of one or more artifacts in the each second initial image of the one or more second initial images.

In some embodiments, the first computing system 120 may input the second objective information into the initial objective feature map determination model. The first computing system 120 may further use the second objective information of the each second initial image as a second training sample, and use a score corresponding to the each second initial image as a second label, and adjust one or more parameters of the initial objective feature map determination model based on the second label to obtain the trained objective feature map determination model. A second label of a second training sample may refer to a desired score or a standard score corresponding to the second initial image (i.e., a score of an output image obtained by processing the second initial image using the trained/initial artifact removal model described in FIG. 2 or FIG. 3).

In some embodiments, the first computing system 120 may input the each second initial image into a pre-trained artifact removal model to obtain an output image. The first computing system 120 may determine a score of the output image. The first computing system 120 may determine the second label based on the score. More descriptions for the score of the output image may be found elsewhere in the present disclosure (e.g., FIG. 3 and the descriptions thereof).

In some embodiments, the pre-trained artifact removal model may be a model for training the initial artifact removal model and/or the initial objective feature map determination model. In some embodiments, the pre-trained artifact removal model may be obtained by pre-training an initial artifact removal model with initial model parameters. Merely by way of example, the first computing system 120 may obtain one or more third initial images. The first computing system 120 may further pre-train an initial artifact removal model by using the one or more third initial images as third training samples, and using one or more reference standard images corresponding to the one or more third initial images as third labels to obtain the pre-trained artifact removal model. Each of the one or more reference standard images may have a reference score.

In some embodiments, each of the third training sample(s) and a preliminary correction image corresponding to the third training sample may be input into the initial artifact removal model, and the initial artifact removal model may process the third training sample to obtain an output image. In some embodiments, a value of a second loss function may be determined based on a difference between the output image and the reference standard image corresponding to the third training sample, and parameters of the initial artifact removal model may be adjusted based on the value of the second loss function. The reference standard image may include a reference standard image with a highest score. For example, if a range of the reference score for the reference standard image is from 1 to 5, the reference standard image may have a reference score of 5.

In some embodiments, the initial objective feature map determination model may be trained by one or more training algorithms based on the one or more second training samples to update parameters of the initial objective feature map determination model. For example, the training may be performed based on a gradient descent algorithm. In some embodiments, each of the one or more second training samples may be input into the initial objective feature map determination model, and the initial objective feature map determination model may process the second training sample to obtain an output value. In some embodiments, the output value may be a predicted score corresponding to the second initial image (or the second training sample). In some embodiments, a value of a third loss function may be determined based on a difference between the predicted score and the second label (i.e., the reference score), and the parameters of the initial objective feature map determination model may be adjusted based on the value of the third loss function.

In some embodiments, if the objective feature map determination model in the training satisfies a fourth termination condition, the training of the initial objective feature map determination model may be terminated, and the updated objective feature map determination model in the current training may be designated as a trained objective feature map determination model. Exemplary fourth termination conditions may be that the value of the third loss function obtained in the certain training is less than a threshold value, that a certain count of trainings has been performed, that the third loss function converges such that the difference of the values of the third loss function obtained in a previous training and the current training is within a threshold value, a prediction accuracy of the objective feature map determination model is greater than an accuracy threshold, etc.

In this way, during the training of the objective feature map determination model, the score of the output image of the pre-trained artifact removal model may be used as the second label, which may effectively improve the accuracy of the second label, thereby improving the accuracy and efficiency of the training of the objective feature map determination model. In some embodiments, as described elsewhere in the present disclosure, the score of the output image of the pre-trained artifact removal model may reflect how a user (e.g., a doctor) evaluates the output of the pre-trained artifact removal model. For example, the score of the output image of the pre-trained artifact removal model may be determined by a user. Needs of the user may be well satisfied by using the score of the output image of the pre-trained artifact removal model as the second label.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 600 may be accomplished with one or more additional operations not described and/or without one or more of the operations discussed above.

It should be noted that the initial objective feature map determination model may include a scoring layer during the training process. An input of the scoring layer may be a predicted objective feature map generated by the initial objective feature map determination model based on a second training sample, and an output of the scoring layer may be a predicted score corresponding to a second initial image that corresponds to the second training sample. The parameters of the initial objective feature map determination model may be updated based on the difference between the predicted score output by the initial objective feature map determination model and the second label of the second training sample (e.g., a score determined by a doctor). In some embodiments, the trained/initial objective feature map determination model may be applied to obtain an objective feature map for training the initial artifact removal model or for image processing, and the scoring layer may be omitted, so that the trained/initial objective feature map determination model can directly output an objective feature map. In some embodiments, the scoring layer may be the last layer of the initial objective feature map determination model, and correspondingly, an output of the penultimate layer of the initial objective feature map determination model is the objective feature map.

Figure 7:
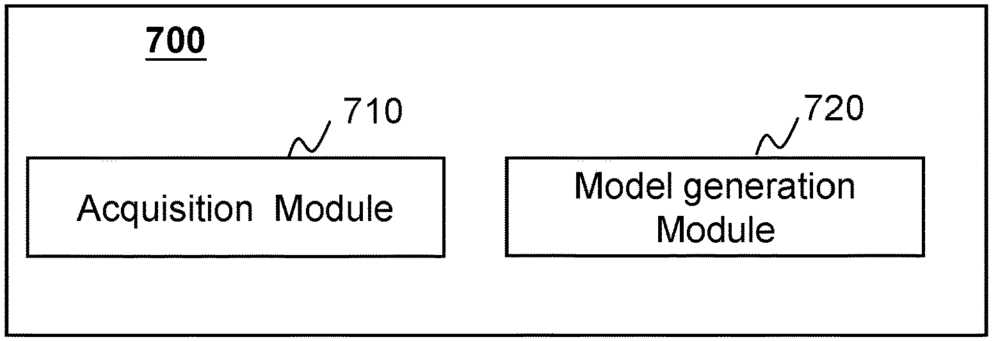
FIG. 7 is a block diagram illustrating an exemplary first computing system 120 according to some embodiments of the present disclosure.

FIG. 7 is a block diagram illustrating an exemplary first computing system 120 according to some embodiments of the present disclosure. FIG. 8 is a block diagram illustrating an exemplary second computing system 130 according to some embodiments of the present disclosure. In some embodiments, the second computing system 130 may be configured to perform methods for artifact removal disclosed herein. The first computing system 120 may be configured to generate one or more machine learning models that can be used in the artifact removal methods. In some embodiments, the first computing system 120 and the second computing system 130 may be respectively implemented on a computing system. Alternatively, the first computing system 120 and the second computing system 130 may be implemented on a same computing system.

As shown in FIG. 7, the first computing system 120 may include an acquisition module 710, and a model generation module 720.

The acquisition module 710 may be configured to obtain data used to train one or more machine learning models, such as an initial artifact removal model, an initial objective feature map determination model, or the like, or any combination thereof, disclosed in the present disclosure. For example, the acquisition module 710 may be configured to obtain one or more first initial images, one or more preliminary correction images corresponding to the one or more first initial images, one or more objective feature maps corresponding to the one or more first initial images, and one or more reference images corresponding to the one or more first initial images. As another example, the acquisition module 710 may be configured to obtain one or more second initial images, and second objective information of one or more artifacts in each second initial image of the one or more second initial images. More descriptions regarding the obtaining of the data used to train the machine learning model(s) may be found elsewhere in the present disclosure. See, e.g., operations 210 and 220 in FIG. 6, operation 610 in FIG. 6, and relevant descriptions thereof.

The model generation module 720 may be configured to generate the one or more machine learning models by model training. In some embodiments, the one or more machine learning models may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the one or more machine learning models may be a supervised learning algorithm, a semi-supervised learning algorithm, an unsupervised learning algorithm, or the like. More descriptions regarding the generation of the one or more machine learning models may be found elsewhere in the present disclosure. See, e.g., operation 230 in FIG. 2, operation 310-330 in FIG. 3, operation 620 in FIG. 6, and relevant descriptions thereof.

As shown in FIG. 8, the second computing system 130 may include an acquisition module 810 and a generation module 820.

The acquisition module 810 may be configured to obtain information relating to the artifact removal system 100. For example, the acquisition module 402 may obtain a fourth initial image, a preliminary correction image corresponding to the fourth initial image, and an objective feature map corresponding to the fourth initial image. In some embodiments, the objective feature map may include objective information relating to one or more artifacts in the fourth initial image. More descriptions regarding the obtaining of the fourth initial image, the preliminary correction image corresponding to the fourth initial image, and the objective feature map corresponding to the fourth initial image may be found elsewhere in the present disclosure. See, e.g., operation 410 in FIG. 4, and relevant descriptions thereof.

The generation module 820 may be configured to obtain a target image with no or reduced artifact by inputting the fourth initial image, the preliminary correction image corresponding to the fourth initial image, and the objective feature map corresponding to the fourth initial image into a trained artifact removal model. The target image refers to an image obtained by partially or completely removing the artifacts in the fourth initial image. Merely by way of example, the fourth initial image, the preliminary correction image corresponding to the fourth initial image, and the objective feature map corresponding to the fourth initial image may be input into the trained artifact removal model, and the trained artifact removal model may directly output the target image. More descriptions regarding the obtaining of the target image with no or reduced artifact may be found elsewhere in the present disclosure. See, e.g., operation 420 in FIG. 4, and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the first computing system 120 as described in FIG. 7 and/or the second computing system 130 as described in FIG. 8 may share two or more of the modules, and any one of the modules may be divided into two or more units. For instance, the first computing system 120 as described in FIG. 7 and/or the second computing system 130 as described in FIG. 8 may share a same acquisition module; that is, the acquisition module 710 and the acquisition module 810 are a same module. In some embodiments, the first computing system 120 as described in FIG. 7 and/or the second computing system 130 as described in FIG. 8 may include one or more additional modules, such as a storage module (not shown) for storing data.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for training an initial artifact removal model, which is implemented on a computing device including at least one processor and at least one storage device, comprising:

generating, by the at least one processor, first initial images using a biomedical imaging technique and objective feature maps corresponding to the first initial images, wherein the first initial images are medical images, and the objective feature maps include objective information relating to artifacts in the initial images;

obtaining, by the at least one processor, reference images corresponding to the first initial images;

generating, by the at least one processor, a trained artifact removal model capable of removing one or more artifacts in a medical image corresponding to objective information represented by an objective feature map by training the initial artifact removal model using the first initial images, the objective feature maps, and the reference images, wherein the initial artifact removal model is trained by:

inputting, by the at least one processor, the first initial images and the objective feature maps into the initial artifact removal model;

using, by the at least one processor, the first initial images as first training samples, and using, by the at least one processor, the reference images as first labels corresponding to the first training samples, and adjusting, by the at least one processor, one or more parameters of the initial artifact removal model based on the objective feature maps and the first labels.

2. The method of claim 1, further comprising:

obtaining, by the at least one processor, preliminary correction images corresponding to the first initial images; and generating, by the at least one processor, the trained artifact removal model by training the initial artifact removal model using the first initial images, the preliminary correction images, the objective feature maps, and the reference images.

3. The method of claim 1, wherein the objective feature maps are obtained by the at least one processor by:

for each first initial image of the first initial images, obtaining objective information corresponding to the first initial image;

transforming the objective information into one or more word vectors based on a feature mapping dictionary;

generating an objective feature map corresponding to the first initial image by combining the word vectors.

4. The method of claim 1, wherein each objective feature map of the objective feature maps is obtained by the at least one processor using a trained objective feature map determination model, the trained objective feature map determination model including an objective information acquisition unit and an objective feature map generation unit, the each objective feature map being obtained by:

inputting a first initial image of the first initial images corresponding to the each objective feature map into the objective information acquisition unit to obtain at least a portion of objective information corresponding to the first initial image;

transforming the at least a portion of objective information into one or more word vectors based on a feature mapping dictionary;

generating the each objective feature map by inputting the word vectors corresponding to the at least a portion of objective information into the objective feature map generation unit.

5. The method of claim 1, wherein the training the initial artifact removal model includes:

obtaining an initial objective feature map determination model;

training the initial objective feature map determination model and the initial artifact removal model synchronously, wherein one or more word vectors corresponding to objective information of each first initial image of the first initial images are input into the initial objective feature map determination model, and the initial objective feature map determination model outputs an objective feature map corresponding to the each first initial image.

6. The method of claim 5, wherein the training the initial objective feature map determination model and the initial artifact removal model synchronously includes:

inputting the objective feature map output by the initial objective feature map determination model into the initial artifact removal model, and adjusting parameters of the initial artifact removal model based on an output of the initial artifact removal model, while remaining parameters of the initial objective feature map determination model unchanged;

determining a score of the output of the initial artifact removal model;

designating the score as a second label to train the initial objective feature map determination model and the initial artifact removal model synchronously, and adjusting the parameters of the initial objective feature map determination model based on the second label, while remaining the parameters of the initial artifact removal model unchanged;

wherein in the synchronous training of the initial objective feature map determination model and the initial artifact removal model, the second label is updated based on the score of the output of the initial artifact removal model.

7. The method of claim 6, wherein the trained artifact removal model includes two or more artifact removal sub-models;

a trained objective feature map determination model includes a classification model;

a classification result output by the classification model is configured to indicate a target artifact removal sub-model among the two or more artifact removal sub-models used for artifact removal.

8. A method for training an initial objective feature map determination model, which is implemented on a computing device including at least one processor and at least one storage device, comprising:

generating, by the at least one processor, second initial images using a biomedical imaging technique, and obtaining, by the at least one processor, objective information corresponding to each second initial image of the second initial images, wherein the second initial images are medical images, and the objective information corresponding to the each second initial image relates to artifacts in the second initial image;

inputting, by the at least one processor, the objective information into the initial objective feature map determination model;

using, by the at least one processor, the objective information corresponding to the each second initial image as a second training sample, and using, by the at least one processor, a score corresponding to the each second initial image as a second label, and adjusting, by the at least one processor, one or more parameters of the initial objective feature map determination model based on the second label to obtain a trained objective feature map determination model, wherein, the initial objective feature map determination model including a scoring layer, an input of the scoring layer is a predicted objective feature map generated by the initial objective feature map determination model based on a second training sample, and an output of the scoring layer is a predicted score corresponding to a second initial image that corresponds to the second training sample.

9. The method of claim 8, wherein the second label is obtained by:

inputting the each second initial image into a pre-trained artifact removal model to obtain an output image;

determining a score of the output image;

determining the second label based on the score.

10. The method of claim 9, wherein the pre-trained artifact removal model is obtained by:

obtaining third initial images;

pre-training an initial artifact removal model by using the third initial images as third training samples, and using reference standard images corresponding to the third initial images as third labels, to obtain the pre-trained artifact removal model, wherein each of the reference standard images has a reference score.

11. The method of claim 8, wherein the objective information corresponding to each second initial image includes at least one of a type, a size, an intensity, a location of one or more artifact in the each second initial image, or an artifact rate, scan parameters, a scan scene, window width and window level information of the each second initial image.

12. A method for artifact removing, which is implemented on a computing device including at least one processor and at least one storage device, comprising:

generating, by the at least one processor, an initial image using a biomedical imaging technique and obtaining, by the at least one processor, an objective feature map corresponding to the initial image, wherein the initial image is a medical image, and the objective feature map includes objective information relating to artifacts in the initial image; and obtaining a target image with no or reduced artifact by inputting the initial image and the objective feature map into a trained artifact removal model, wherein the objective feature map facilitates the trained artifact removal model to remove one or more artifacts corresponding to objective information represented by the objective feature map.

13. The method of claim 12, further comprising:

obtaining, by the at least one processor, a preliminary correction image corresponding to the initial image; and obtaining, by the at least one processor, the target image with no or reduced artifact by inputting the initial image, the preliminary correction image, and the objective feature map into the trained artifact removal model.

14. The method of claim 12, wherein the objective feature map is used as a hyper-parameter of the trained artifact removal model.

15. The method of claim 13, wherein the objective feature map includes information of window width and window level, and the obtaining a target image with no or reduced artifact includes:

adjusting, based on the information of window width and window level included in the objective feature map, window widths and window levels of the initial image, the preliminary correction image, and the target image using the trained artifact removal model.

16. The method of claim 13, wherein the trained artifact removal model includes two or more artifact removal sub-models, and the obtaining a target image with no or reduced artifact includes:

determining a target sub-model among the two or more artifact removal sub-models based on the objective feature map;

obtaining the target image with no or reduced artifact by inputting the initial image, the preliminary correction image, and the objective feature map into the target sub-model.

17. The method of claim 12, wherein the objective feature map includes information relating to a degree of artifact removal.

18. The method of claim 13, further comprising:

determining, by the at least one processor, a score of the target image;

determining, by the at least one processor, whether to further process the target image based on the score;

in response to a determination that the target image is to be further processed, updating, by the at least one processor, the objective feature map based on the score to obtain an updated objective feature map;

obtaining, by the at least one processor, an updated target image by inputting the target image, the preliminary correction image, and the updated objective feature map into the trained artifact removal model.

19. The method of claim 13, further comprising:

obtaining, by the at least one processor, an instruction through a user interface, the instruction indicating a score of the target image or information relating to adjustment of a degree of artifact removal;

updating, by the at least one processor, the objective feature map based on the instruction to obtain an updated objective feature map;

obtaining, by the at least one processor, an updated target image by inputting the target image, the preliminary correction image, and the updated objective feature map into the trained artifact removal model.

20. The method of claim 18, wherein the determining a score of the target image includes:

determining a similarity between the target image and the initial image using a similarity algorithm;

determining the score of the target image based on the similarity.

* * * * *